(12) United States Patent
Dorris et al.

(10) Patent No.: US 7,953,110 B1
(45) Date of Patent: *May 31, 2011

(54) TCP/IP TUNNELING PROTOCOL FOR LINK 16

(75) Inventors: Steven A. Dorris, Ofallon, MO (US); David E. Corman, Creve Coeur, MO (US); Thomas S. Herm, Frontenac, MO (US); Eric Martens, Crestwood, MO (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/685,654

(22) Filed: Jan. 11, 2010

Related U.S. Application Data (63) Continuation of application No. 11/196,865, filed on Aug. 3, 2005, now Pat. No. 7,646,788.

(51) Int. Cl.
*H04J 3/16* (2006.01)
*H04J 3/24* (2006.01)
*H04L 12/56* (2006.01)

(52) U.S. Cl. .................. 370/466; 370/474; 370/394

(58) Field of Classification Search .............. 370/392, 370/474, 476, 466, 473, 394
See application file for complete search history.

(56) References Cited

U.S. PATENT DOCUMENTS

| | | | |
|---|---|---|---|
| 4,943,978 A | 7/1990 | Rice | |
| 6,005,568 A | 12/1999 | Simonoff et al. | |
| 6,418,324 B1 | 7/2002 | Doviak et al. | |
| 6,532,068 B2 * | 3/2003 | Detalle et al. | 356/318 |
| 6,711,164 B1 * | 3/2004 | Le et al. | 370/392 |
| 6,993,021 B1 * | 1/2006 | Chuah et al. | 370/389 |
| 7,068,998 B2 | 6/2006 | Zavidniak | |
| 7,136,356 B2 * | 11/2006 | Suzuki et al. | 370/235 |
| 7,203,688 B2 * | 4/2007 | Hopkins | 1/1 |
| 7,260,108 B2 | 8/2007 | Hasegawa | |
| 7,539,196 B2 | 5/2009 | Flavin et al. | |
| 7,764,708 B2 * | 7/2010 | Okamori | 370/466 |
| 2001/0047406 A1 | 11/2001 | Araujo et al. | |
| 2001/0048681 A1 | 12/2001 | Bilic et al. | |
| 2002/0067725 A1 | 6/2002 | Oguchi et al. | |
| 2002/0080059 A1 | 6/2002 | Tran | |
| 2002/0174218 A1 | 11/2002 | Dick et al. | |
| 2003/0122701 A1 | 7/2003 | Tran | |

(Continued)

OTHER PUBLICATIONS

Michael Brown; Gateway to the Global Grid; http://www.mitre.org/news/events/tech02/briefings/communication_network/correia_presentation/correia.pdf; © 2002, The Mitre Corporation, USA.

(Continued)

*Primary Examiner* — Kwang B Yao
*Assistant Examiner* — Candal Elpenord
(74) *Attorney, Agent, or Firm* — John Lepore (57) ABSTRACT

A method and system are provided for executing a protocol for tunneling of transmission control protocol/internet protocol (TCP/IP) packets over a tactical link. The tunneling protocol includes interfacing to a host software on a node of a tactical network using a TAP interface; breaking up ethernet packets from the TAP interface into J16.0 messages that include payload data from the ethernet packet and header information that uniquely identifies the J16.0 message for deterministic reassembly of the ethernet packet from the stream of J16.0 messages in which it is included. The J16.0 messages may be transmitted using a fighter data link over a tactical network link. At the destination node of the link, the J16.0 messages may be reassembled into ethernet packets, allowing the tactical network to be implemented as virtual private network having (internet protocol) IP addresses for each node.

23 Claims, 5 Drawing Sheets

U.S. PATENT DOCUMENTS

| | | | |
|---|---|---|---|
| 2003/0158963 A1* | 8/2003 | Sturdy et al. | 709/238 |
| 2004/0133692 A1 | 7/2004 | Blanchet et al. | |
| 2004/0174822 A1 | 9/2004 | Bui | |
| 2006/0039379 A1 | 2/2006 | Abe et al. | |
| 2006/0262808 A1 | 11/2006 | Lin et al. | |

OTHER PUBLICATIONS

Kenneth Brayer; Global Grid for Large C2/ISR Aircraft with Joint Stars Example*; http://www.mitre.org/work/tech_papers/tech_papers_01/brayer_global_grid/brayer_global_grid.pdf; (2001) The Mitre Corporation; Bedford Massachusetts 01730.

Andrew S. Tanenbaum, Computer Networks, 2003, Pearson Education, Inc., pp. 425-426.

Search report for GB0615477.7 dated Oct. 31, 2006 for The Boeing Company.

* cited by examiner

TCP/IP TUNNELING PROTOCOL FOR LINK 16

CROSS REFERENCE TO RELATED APPLICATIONS

This application is a continuation application of U.S. application Ser. No. 11/196,865, filed Aug. 3, 2005.

STATEMENT REGARDING FEDERALLY SPONSORED RESEARCH OR DEVELOPMENT

This invention was made with Government support under contract F33615-02-D-4034 DO 0001 awarded by the Air Force. The government has certain rights in this invention.

BACKGROUND OF THE INVENTION

The present invention generally relates to network communications and, more particularly, to a tunneling protocol for providing bi-directional connectivity for tactical communication links through networks that use TCP/IP (Transmission Control Protocol/Internet Protocol) protocol, such as the Internet.

The Global Information Grid (GIG) is a fundamental building block of information superiority in the network centric operations (NCO) environment. The GIG being developed by the United States military will be a "network of networks" consisting of communications paths, computational nodes, operating systems, and information management applications that enable network-centric computing and communications across the joint battlespace. The connectivity and computing capabilities of the GIG enable the deployed sensors to generate battlespace awareness. Battlespace awareness is a key competitive advantage in warfare, and results when the level of information possessed concerning friendly forces, enemy forces, neutral forces, and the environment in which they are deployed reaches a sufficient level.

To take advantage of the battlespace awareness that the GIG provides, manned and unmanned systems (e.g. AWACS, F-15, C-17, J-UCAS, KC-10, B-52, B-1B, CV-22 and F/A-18) need to be connected to the GIG. These tactical platforms represent the "last mile" or the "edge" in the network infrastructure. Communication to the "edge" for the tactical platforms is typically supported through tactical data links such as Link 16, Tactical Common Data Link (TCDL), and Common Data Link (CDL), which provide complex and "closed" protocol structures, e.g., protocols that are not readily adaptable to intercommunicate with other protocols. Link 16, because of its lower bandwidth, poses an especially challenging problem. What is needed is a scheme for "opening up" the tactical data link protocols to embrace the communication protocol for the GIG and the Internet—using, for example, TCP/IP and technology for optimizing use of available bandwidth. The same technology applicable for tactical data links would also be broadly applicable to existing low bandwidth networks for commercial and private aircraft.

As can be seen, there is a need for providing bi-directional GIG connectivity to manned and unmanned systems. There is also a need for a technology that will allow new and fielded systems with Link 16 terminals to connect to the GIG for providing them with battlespace awareness. Moreover, there is a need for assuring information security by the encryption of Link 16 communications.

SUMMARY OF THE INVENTION

In one embodiment of the present invention, a system includes an electronic processor that performs tunneling of transmission control protocol/internet protocol (TCP/IP) packets over a tactical link.

In another embodiment of the present invention, a method for tunneling transmission control protocol/internet protocol (TCP/IP) packets includes operations of receiving an ethernet packet from a TAP interface; creating at least one tactical link message including data from the ethernet packet; and transmitting the tactical link message over a tactical link.

In still another embodiment of the present invention, a method of using transmission control protocol/internet protocol (TCP/IP) for sending and receiving tactical digital information includes operations of: (1) interfacing to a host software using a TAP interface; (2) receiving an ethernet packet from the TAP interface; (3) creating at least one J16.0 message that includes payload data from the ethernet packet; (4) placing header information into the J16.0 message that uniquely identifies the J16.0 message for deterministic reassembly of the ethernet packet from a plurality of J16.0 messages that includes the J16.0 message; (5) transmitting the J16.0 message using a fighter data link over a network link of a tactical network.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention solves the problem of providing bi-directional GIG connectivity to manned and unmanned systems. and provides a protocol—TCP/IP Tunneling Protocol for tactical Links (TTPL)—for tactical systems that is compatible with the Global Information Grid (GIG). One embodiment, for example, may allow new and fielded systems with Link 16 terminals to connect to the GIG for providing them with battlespace awareness. By tunneling TCP/IP, such an embodiment can provide connectivity and information security because of the encrypted nature of Link 16 communications. The TTPL system of one embodiment can be hosted on all link equipped platforms to be connected to the GIG. To complete the link between the GIG and the battlefield, a TTPL system may be located on at least one platform that is connected to each tactical link and to the GIG via broadband access. These platforms typically would be Command/Control (C2) elements or Air Operations Centers (AOC). Platforms with broadband access to the GIG would be gateways to the GIG for the tactical nodes connected through them.

Connection to the GIG via embodiments of the present invention using TTPL may enable tactical platforms to utilize rich information sources provided through the Department of Defense (DoD) Secret Internet Protocol Router Network (SIPRNET). TTPL can employ advanced technologies like tactical platform Guardian and Host Agent (GA/HA). Using TTPL as in one embodiment, Guardian Agent and Host Agent pairs may filter information available in the GIG and provide tactical platforms with the information necessary to protect and command the platform, vastly increasing their lethality and survivability. The TTPL protocol may provide a common communication interface for the Agent technology. Having the TTPL system deployed will enable common software implementations of GA/HA pairs.

An embodiment of the present invention provides a novel application of virtual private network (VPN) technology to tactical data links, enabling tactical platforms to be viewed as IP addresses (see FIG. 1) on a tactical internet. In particular, the TTPL system according to one embodiment implements a VPN tunneled across a tactical network. A key element of embodiments of the invention not seen in the prior art is the process of tunneling ethernet packets over the tactical data link. In one implementation, tunneling may be used to place part of an ethernet packet within a J16.0 Link 16 message and send it over the network. The endpoints called tunnel interfaces are where packets enter and exit the network.

Figure 1:
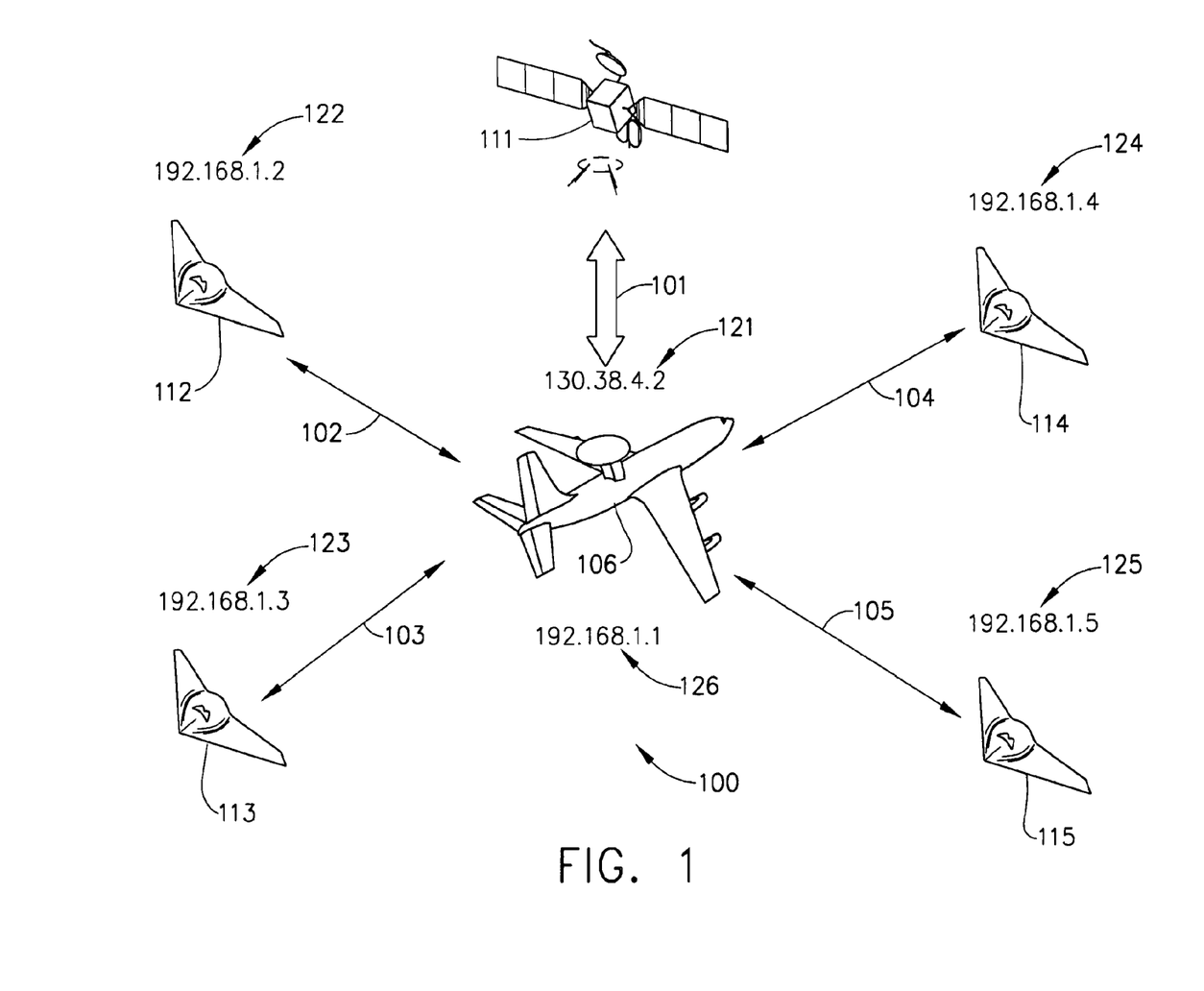
FIG. 1 is a network topology diagram illustrating a communication network according to one embodiment of the present invention.

FIG. 1 illustrates one example of a tactical communication network 100 in accordance with an embodiment of the present invention. Tactical network 100 may provide communication over tactical data links 102, 103, 104, and 105, for example, between a C2 platform (e.g., an AOC or C2 aircraft) 106 and tactical platforms (e.g., fighter aircraft) 112, 113, 114, and 115. Tactical network 100 may also provide communication over a link 101—which may be a satellite link relayed via transponder through satellite 111 as shown in FIG. 1—between C2 platform 106 and a ground station command center (not shown) or any other entity connected to the GIG. Tactical communication network 100 may be implemented as a VPN so that each platform 106, 112, 113, 114, and 115 (also referred to as nodes of the network 100) may have an IP address for communication over the corresponding link. For example, as shown in FIG. 1, node 112 may have IP address 122 (with a value of 192.168.1.2) and node 106 may have IP address 126 (with a value of 192.168.1.1) for communication with each other over link 102. Node 106 may also have IP address 121 (with a value of 130.38.4.2) for communication over link 101 with the GIG. IP addresses 123, 124, and 125 (with the values shown in FIG. 1) may be described similarly with regard, respectively, to nodes 113, 114, 115, and 106 and links 103, 104, and 105. The TTPL system, as employed in communication network 100, for example, possesses the ability to initialize and control a fighter data link (FDL) terminal. For example, each of nodes 112, 113, 114, and 115 may communicate using an FDL terminal at the respective node. The TTPL system first initializes and then requests the terminal to enter into a Link 16 tactical network. For example, a Link 16 tactical network may be realized over the same links 102-105 used by tactical communication network 100. The TTPL system provides the host system—e.g., a Link 16 tactical network among nodes 106, 112, 113, 114, and 115 using links 102, 103, 104, and 105—an ethernet adapter interface. This interface provides an IP address—such as IP address 121—to the tactical system, which the tactical system—e.g., tactical network 100—can use to connect to the GIG.

Figure 2:
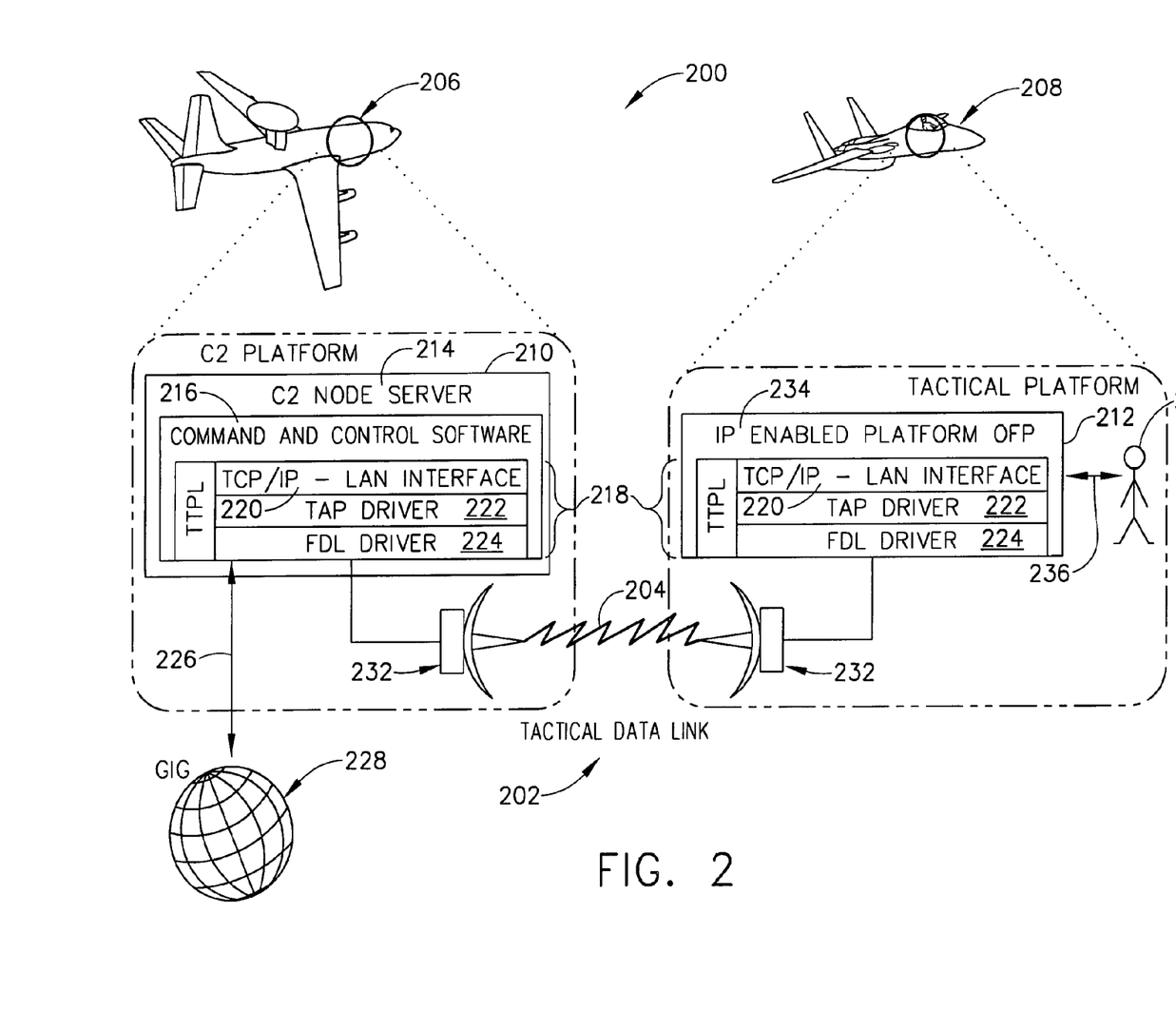
FIG. 2 is a system diagram illustrating an implementation of a TCP/IP tunneling protocol for a link in a communication network in accordance with one embodiment of the present invention.
Figure 3:
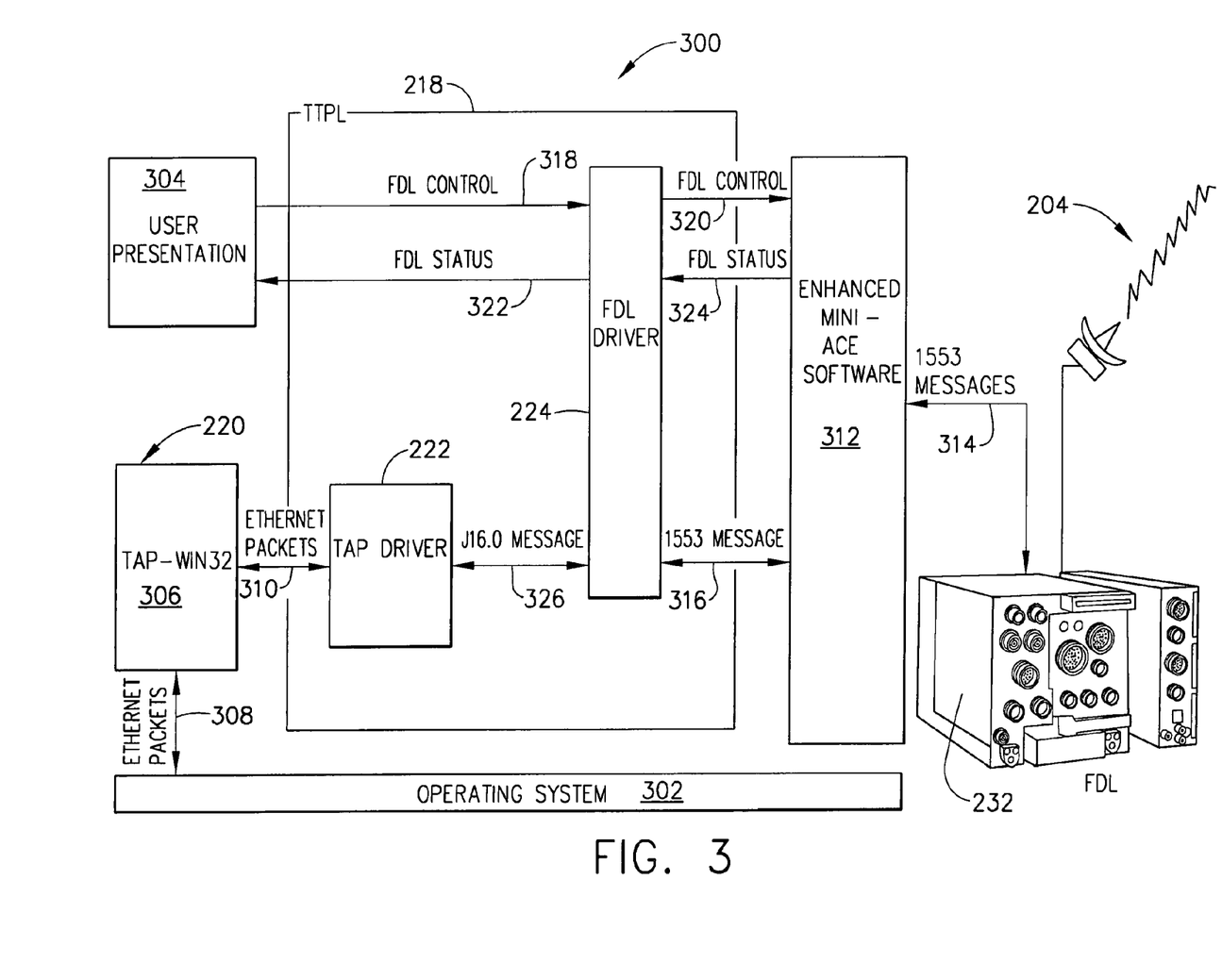
FIG. 3 is a system block diagram for a terminal for a link in a communication network in accordance with one embodiment of the present invention.

FIGS. 2 and 3 illustrate one embodiment of a general software architecture for TTPL systems that may be appropriate to multiple tactical data links—such as links 102-105 of tactical network 100—and that may implemented using processor hardware—such as computer hardware—included in communication system 200. An exemplary TTPL software implementation is described for Link-16 for purposes of illustration, but the architecture may be implemented for other tactical link protocols—such as Tactical Common Data Link (TCDL), and Common Data Link (CDL). As shown in FIG. 2, communication system 200 may provide a network link 202, using tactical data link 204, between a C2 platform 206, for example, and a tactical platform 208, which may be included in tactical network 100. Each platform of a tactical network—such as platforms 206 and 208—may include processing hardware—such as computers 210 and 212, respectively—that execute software implementing the TTPL system. Computer 210, for example, may operate as a C2 node server 214 that executes command and control software 216. Command and control software 216 may interface with and communicate over network link 202 using TTPL system 218. TTPL system 218 may comprise, for example, a TCP/IP-to-LAN interface 220, TAP ("TAP" indicates virtual ethernet network device as opposed, e.g., to "TUN"—indicating virtual point-to-point network device) driver 222, and FDL driver 224, each of which may embody a computer-implemented method in a machine readable software format. C2 node server 214 may provide a connection 226 of C2 platform 206 to the GIG 228. Connection 226 may be a satellite link—such as link 101—and may join communication system 200 into network 100, for example.

TTPL system 218 at platform 206 may communicate over network link 202 with another TTPL system 218 installed at platform 208, which may include another instantiation of TCP/IP-to-LAN interface 220, TAP driver 222, and FDL driver 224 at tactical platform 208. Network link 202 may provide communication via fighter data links (FDL) 232 and tactical data link 204. FDLs 232 may be radio terminals providing Link-16 connectivity, for example, and link 204 may provide connectivity according to MIL-STD-6016/STANAG-5516, which is incorporated by reference. The example presented describes one embodiment for tunneling Link-16, but other embodiments may be used for tunneling other types of tactical data links—such as TCDL and CDL—as apparent to one of ordinary skill in the art. At tactical platform 208, computer 212 may operate, for example, as an operational flight program (OFP) 234 having an interface 236 with a pilot 238. In the case of a human pilot 238, interface 236 may comprise, for example, a monitor or other control displays and switches or other input devices. In the case of an unmanned tactical platform 208, interface 236 may comprise, for example, a remote communication link to a ground controller pilot 238; or, as a further example, an unmanned tactical platform 208 may have an automated control system acting as pilot 238 with electronic interface 236 to OFP 234. As indicated by juxtaposition in FIG. 2, TCP/IP-to-LAN interface 220, TAP driver 222, and FDL driver 224 may be connected to interact and communicate with one another, the operating systems of computers 210 and 212, command and control software 216, OFP 234, and FDLs 232. An example of those interrelationships according to one embodiment of the present invention is shown in FIG. 3.

FIG. 3 shows tactical data link terminal 300 according to one embodiment. Terminal 300 may interface a platform—such as C2 platform 206 or tactical platform 208 in a communication system 200—to a tactical network—such as network 100—to provide a node—such as node 106, 112, 113, 114, or 115 in tactical network 100. Terminal 300 may connect to a tactical link 204 via an FDL 232 (see FIGS. 2 and 3). User interface to terminal 300 may be provided through an operating system 302 executing on a processor—such as computer 210 on C2 platform 206 or computer 212 on tactical platform 208. For example, operating system 302 may be a WINDOWS® operating system and may, for example, provide information on a monitor and accept keyboard and mouse inputs as generally known. Additional user interface may be provided by user presentation module 304.

FIG. 3 shows exemplary interrelationships of TCP/IP-to-LAN interface 220, TAP driver 222, and FDL driver 224, the operating systems 302 of computers 210 and 212, and FDLs 232 in more detail than FIG. 2. TCP/IP-to-LAN interface 220 may be implemented as a TAP interface, for example, by TAP-Win32 driver 306 communicating with operating system 302 using ethernet packets 308 and communicating with TAP driver 222 using ethernet packets 310. A TAP-Win32 driver 306 may be implemented, for example, from shareware called "OpenVPN for Windows" that implements an Open Source TUN/TAP interface.

TTPL system 218 may communicate through FDL driver 224 with FDL 232 using enhanced mini-ACE (Adaptive Communication Environment) module 312 using data messages 314 and 316. Data messages 314, 316 may be, for example, "1553 messages" as indicated in FIG. 3, where "1553" refers to MIL-STD-1553, which is incorporated by reference and which may provide the format and specifications for 1553 messages, as known in the art. The FDL driver 224 may be compatible with DDC Enhanced-ACE 1553 libraries (DDC refers to: Data Device Corporation; 105 Wilbur Place; Bohemia, N.Y. 11716). The FDL driver 224 may also provide MIL-STD-1553 messages for FDL control signals 318, 320 and FDL status signals 322, 324 compatible with prior art aspects of user presentation module 304 and enhanced mini-ACE software 312. FDL driver 224 may provide initialization and control for FDL 232. The FDL driver 224 may also provide an interface to send and receive tactical link messages 326, which for example may be tactical digital information link-J (TADIL-J) messages, e.g., J16.0 messages as indicated in FIG. 3. The FDL driver 224 may provide an interface to send and receive tactical link messages 326, for example, by "translating" J16.0 messages into 1553 messages (i.e., data messages 316) and vice versa.

In overview, the operation of TTPL system 218 may be summarized in terms of the operation of TAP driver 222 and FDL driver 224.

The TAP driver 222 may be responsible for tunneling ethernet packets 310. Packets 310 received from TCP/IP-to-LAN TAP interface 220 (e.g., from TAP-Win32 driver 306) may be broken into tactical link messages 326—for example, J-Series messages such as J16.0 messages—and tagged with information that can be used for reassembly at their destination, e.g., after being transmitted over tactical data link 204. In the opposite direction of communication, tactical link messages 326—for example, J-Series messages—may be received from the FDL driver 224 and reassembled into ethernet packets 310 and forwarded to the TCP/IP LAN connection, e.g., TAP-Win32 driver 306 of TCP/IP-to-LAN TAP interface 220.

The FDL driver 224 may be used to initialize, control and monitor status of tactical data link terminal 300. FDL driver 224 may accept packets of data, e.g., tactical link messages 326 comprising J16.0 messages, from the TAP driver 222 and send the packets, e.g., data messages 316 comprising 1553 messages, over the tactical data link 204. In the opposite direction of communication, FDL driver 224 may receive packets of data, e.g., data messages 316 comprising 1553 messages, from the tactical data link 204 through enhanced mini-ACE module 312, for example, and send them as tactical link messages 326 comprising, e.g., J16.0 messages, to the TAP driver 222.

Figure 4:
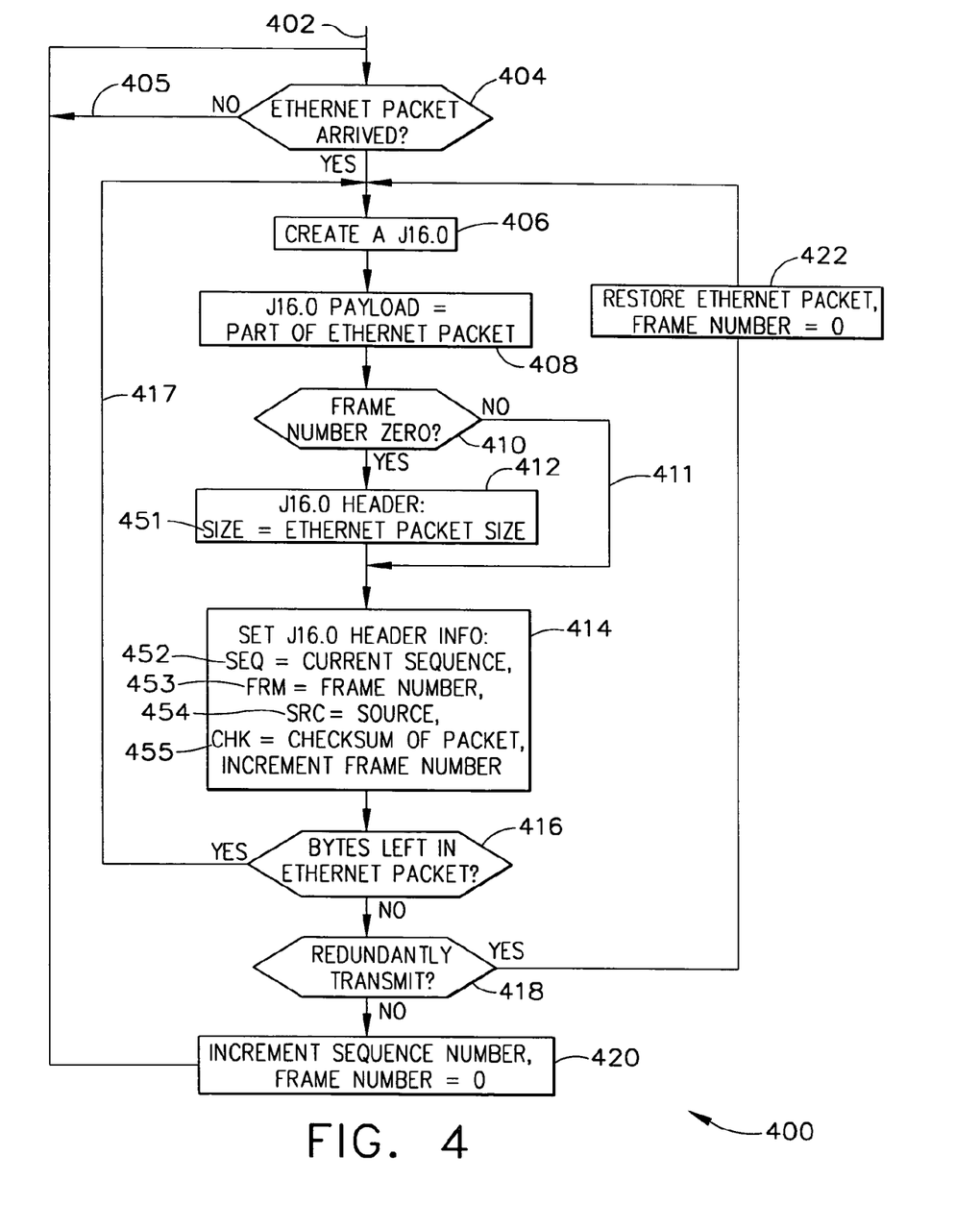
FIG. 4 is a flowchart for a method of processing ethernet packets for a TCP/IP tunneling protocol in a communication network in accordance with one embodiment of the present invention.
Figure 5:
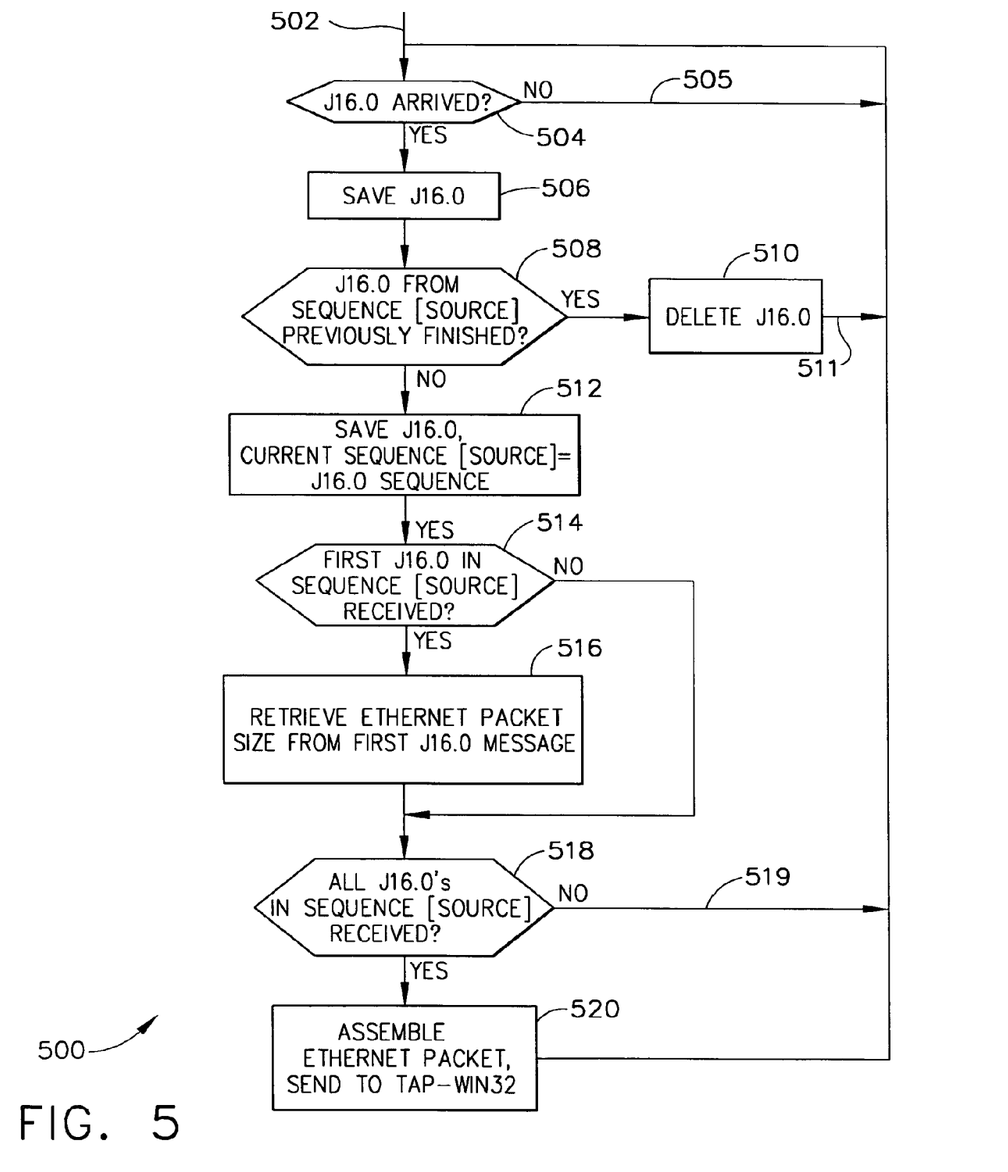
FIG. 5 is a flowchart for a method of processing tactical link messages for a TCP/IP tunneling protocol in a communication network in accordance with one embodiment of the present invention.

FIGS. 4 and 5 describe one exemplary embodiment of methods 400 and 500 for operation of TAP driver 222, and illustrate one example of TAP driver 222 interfacing with a previously installed TAP interface 220 (e.g., TAP-Win32 driver 306) to send and receive ethernet packets 310. Methods 400 and 500 may implement the transmission protocol algorithm (TPA), using, for example, a computer or other processor hardware—such as computers 210, 212. The transmission protocol algorithm (TPA) executed by methods 400 and 500 may be implemented by a transmission protocol library (TPL) that provides a software interface to send large packets of data via Link 16 using J16.0 messages. Although the example uses one particular protocol, i.e., Link 16 using J16.0 messages, those of ordinary skill in the art will understand that the same methods, with appropriate modifications, may be applied, and the TPL transmission protocol library may be adapted, to other types of links and protocols—such as TCDL and CDL.

FIG. 4 describes method 400 for the TPA to receive ethernet packets 310 from the TAP interface 220 and create J16.0 Link 16 messages, i.e., tactical link messages 326. The TAP driver 222 may then forward the packets (e.g., group of tactical link messages 326 for each ethernet packet 310) to the FDL driver 224 via the object request broker (ORB—a standard architecture for distributed object systems, not shown) for transmission on the Link 16 network, e.g., via link 204.

Method 400 may begin at entry point 402. At operation 404 TAP interface 220 may be monitored for an incoming ethernet packet 310. If a new ethernet packet 310 has not arrived, "no" branch 405 may return execution to entry point 402 so that recurring monitoring for incoming ethernet packets 310 may be an on-going process. If a new incoming ethernet packet 310 has arrived, operation 406 may create a new tactical link message 326, which for illustration of the present example may be a J16.0 message. Operation 406 may create new J16.0 message 326, for example, by reserving space in memory according to a specified format for J16.0 messages as known in the art. For example, certain bits of new message 326 may be reserved, while other bits may be available for storing "payload" information and "header" information.

The "payload" information, for example, may include a portion of the ethernet packet 310 data that is desired to be transmitted and may be placed into new message 326 at operation 408. The "header" information, for example, may include information that can be used to uniquely identify each J16.0 message 326 that makes up an ethernet packet 310. For example, a frame number may be included in the header information and the frame number may be set to zero for the first J16.0 message 326 used to make up the incoming ethernet packet 310 and may be incremented for each subsequent J16.0 message 326 used to make up the incoming ethernet packet 310. At operation 410, the frame number may compared to zero, effectively determining whether the new message 326 is the first or a subsequent J16.0 message to make up the incoming ethernet packet 310.

If the first, operation 412 may determine the size—for example, in bytes—of incoming ethernet packet 310 and place the size 451 into the first J16.0 message 326 at specific available bits, those specific bits being consistently used for packet size information in each J16.0 message 326 used to make up the incoming ethernet packet 310. For example, 11 bits of each J16.0 message 326 may be set aside for size 451 by method 400 so that ethernet packets 310 having a size in the range of 0-2047 bytes may be acceptable. The 11 bits need not be contiguous but should be chosen from the available bits that do not conflict with pre-existing J16.0 specifications, which are generally known. If the new message 326 is not the first but a subsequent J16.0 message going to make up the incoming ethernet packet 310 (e.g., frame number is not zero), operation 412 may be skipped, as indicated by "no" branch 411, in favor of operation 414. In other words, operation 412 may be performed only for the first J16.0 message 326 used to make up the incoming ethernet packet 310, while operation 414 may be performed for every J16.0 message 326.

At operation 414, additional "header" information may be placed into the new J16.0 message 326 at available bits specific to each piece of header information. As above, the bits for each piece of header information need not be contiguous but should be chosen from the available bits of the new J16.0 message 326 that do not conflict with pre-existing J16.0 specifications. For example, as shown in FIG. 4, additional header information may include a sequence number 452; a frame number 453—which, for example, may be identical to the frame number checked at operation 410; a source identifier 454; and a checksum 455. In the example illustrated, size 451 may occupy 11 bits corresponding to the size in bytes of incoming ethernet packet 310. Each incoming ethernet packet 310 may be assigned a unique sequence number 452, occupying 8 bits in the illustrated example. The frame number 453 may start at zero and be incremented by one for each new J16.0 message 326 going to make up the incoming ethernet packet 310 and may occupy 6 bits in the illustrated example. Operation 414 may, for example as shown in FIG. 4, place the current frame number 453 into the new J16.0 message 326 and then increment the frame number 453 for the next subsequent J16.0 message 326. Source identifier 454 may be used, in the example illustrated, to identify each one of up to 8 "sources" for an ethernet packet 310 on a Joint Tactical Information Distribution System (JTIDS) Net, e.g., tactical network 100. Each participant (e.g. node—such as nodes 106, 112, 113, 114, or 115) on the JTIDS network may be assigned a number (source identifier); when a participant sends out a J16.0 message, that participant, at operation 414, may put the source identifier 454 in the header, occupying 3 bits in the illustrated example. Checksum 455 may be included, occupying 8 bits in the illustrated example, for checking validity of the "payload" data of the ethernet packet 310. For example, checksum 455 may be an exclusive "OR" (XOR) byte checksum. The combination of source identifier 454, sequence number 452, and frame number 453 may be used to uniquely identify each J16.0 message 326 that goes to make up an ethernet packet 310 so that, for example, each ethernet packet 310 transmitted as a series of J16.0 messages 326 can be deterministically reassembled at, for example, a receiving end of link 204.

At operation 416, the incoming ethernet packet 310 may be checked to determine whether all of its information, e.g., "payload", has been placed into J16.0 messages 326. If there is information left, method 400 may continue, following branch 417, at operation 406 (note that frame number 453 has already been incremented at operation 414 for the next J16.0 message 326 to be created at operation 406). If all of the incoming ethernet packet 310 has been placed into J16.0 messages 326, an option may be provided at operations 418 and 422 to redundantly re-transmit the same incoming ethernet packet 310 over again, placing it again into another series of J16.0 messages 326, as described by FIG. 4. Regardless of whether the redundant transmit option is used, operation 420 may increment the sequence number 452, for distinctly identifying the next incoming ethernet packet 310, for example, and may reset frame number 453 to zero to identify the first new J16.0 message 326 for the next incoming ethernet packet 310, for example, and may return execution of method 400 to entry point 402.

FIG. 5 describes method 500 for the TPA (executed by the TAP driver 222, for example) to receive J16.0 messages, i.e., tactical link messages 326, from the FDL driver 224 via the ORB and send them to the TPL transmission protocol library, which may reassemble them into ethernet packets 310 and forward the ethernet packets 310 to the TAP interface 220.

Method 500 may begin at entry point 502. At operation 504 FDL driver 224 may be monitored for an incoming tactical link message 326, which for illustration of the present example may be a J16.0 message. If an incoming J16.0 message 326 has not arrived, "no" branch 505 may return execution to entry point 502 so that recurring monitoring for incoming J16.0 messages 326 may be an on-going process. If a new incoming J16.0 message 326 has arrived, operation 506 may save the new incoming J16.0 message 326, for example, in an input buffer for processing. Operation 506 may also checksum verify the data of new incoming J16.0 message 326 using, for example, checksum 455 included in the "header" information of the new incoming J16.0 message 326.

At operation 508, method 500 may check the combination of source identifier 454, sequence number 452, and frame number 453 that may be used to uniquely identify the incoming J16.0 message 326 and the ethernet packet 310 that the payload data of the incoming J16.0 message 326 may be a part of. Thus, operation 508 may determine if all the J16.0 messages 326 that go to make up a particular ethernet packet 310 have been received and if the incoming J16.0 message 326 is part of a completed ethernet packet 310, method 500 may continue at operation 510, deleting the unneeded incoming J16.0 message 326 and returning execution via branch 511 to entry point 502. Otherwise, if the incoming J16.0 message 326 is part of an uncompleted ethernet packet 310, operation 512 may save the incoming J16.0 message 326 and set the current sequence number and source identifier to the sequence number 452 and source identifier 454 of the incoming J16.0 message 326.

Operation 514 may check whether the incoming J16.0 message 326 is the first J16.0 message 326 of the current sequence number 452 and source identifier 454, for example, by checking the frame number 453. For example, if frame number 453 is zero, a first frame may have been received and first frame processing may be carried out at operation 516; otherwise operation 516 may be skipped with execution passing to operation 518. First frame processing at operation 516 may include retrieving the ethernet packet size 451 from the incoming J16.0 message 326 and may also include verifying that the first J16.0 message 326—i.e., the current incoming J16.0 message 326—in a new packet—i.e.—the currently being received, uncompleted ethernet packet 310—contains a valid size.

Operation 518 may check to determine whether all J16.0 messages 326 for a particular (uniquely identified) ethernet packet 310 have been received. For example, operation 518 may check the sequence number 452, source identifier 454, and packet size 451 to determine if all J16.0 messages 326 have been received for a sequence number from a particular source, and if so, assemble the new ethernet packet 310 at operation 520; otherwise, operation 518 may return execution via branch 519 to entry point 502 to resume collecting new incoming J16.0 messages 326 for the as yet uncompleted ethernet packet 310. Operation 520, after having reassembled a new ethernet packet 310 may provide the new data packet, e.g., new outgoing ethernet packet 310, to the host program—such as command and control software 216 or operational flight program 234. For example, operation 520 may provide the new data packet to the host program by sending the outgoing ethernet packet 310 to TAP interface 220.

It should be understood, of course, that the foregoing relates to exemplary embodiments of the invention and that modifications may be made without departing from the spirit and scope of the invention as set forth in the following claims.

We claim:

1. A system comprising:
   an electronic processor that performs tunneling of transmission control protocol/internet protocol (TCP/IP) packets over a tactical link using one or more tactical link messages,
   said electronic processor executes instructions that break up said TCP/IP packets into said tactical link messages; and
   said tactical link messages each comprising a header portion and a data portion in accordance with a tactical link protocol standard,
   said tactical link messages each comprising a first sequencing information in said header portion for sequencing said tactical link messages over said tactical link in accordance with said tactical link protocol standard, and
   wherein said electronic processor executes a TCP/IP tunneling protocol and places a second sequencing information in said header portion of said tactical link messages for deterministic reassembly of said TCP/IP packets, and
   wherein said electronic processor places at least a portion of said TCP/IP packets in said data portion of said tactical link messages.

2. The system of claim 1, wherein said electronic processor places a source identifier in said tactical link messages for identifying a source of the TCP/IP packets.

3. The system of claim 1, wherein:
   said electronic processor executes a driver that receives said TCP/IP packets from a TAP interface.

4. The system of claim 1, wherein:
   said electronic processor executes instructions that reassemble said tactical link messages into said TCP/IP packets.

5. The system of claim 1, wherein:
   said second sequencing information is selected from the group consisting of a sequence number and a frame number.

6. The system of claim 1, wherein:
   said second sequencing information is interspersed with other header data of the tactical link messages in said header portion of said tactical link messages.

7. The system of claim 1, wherein:
   said second sequencing information is stored in one or more non-contiguous bits in said header portion of said tactical link messages.

8. The system of claim 1, wherein:
   said tactical link is selected from the group consisting of a tactical digital information link-J (TADIL-J) link, a Tactical Common Data Link (TCDL), a Common Data Link (CDL), and a Link-16 link.

9. The system of claim 1, further comprising:
   an encrypted fighter data link (FDL) that transmits said tactical link messages over said tactical link.

10. The system of claim 9, further comprising:
    an FDL driver that interfaces said tactical link messages to data messages that are sent and received by said FDL.

11. The system of claim 1, wherein:
    said tactical link is included in a tactical network; and
    said tunneling allows at least one node of said tactical network to have an internet protocol (IP) address.

12. The system of claim 11, wherein:
    said tactical network is a Joint Tactical Information Distribution System (JTIDS) network.

13. The system of claim 11, wherein:
    said tactical network connects to a Global Information Grid (GIG).

14. The system of claim 11, further comprising:
    a Guardian Agent/Host Agent (GA/HA) pair for filtering information transmitted across said tactical link.

15. A system comprising:
    an electronic processor that performs tunneling of Ethernet packets over a tactical link using one or more tactical link messages,
    said electronic processor executes instructions that break up said Ethernet packets into said tactical link messages; and
    said tactical link messages each comprising a header portion and a data portion in accordance with a tactical link protocol standard,
    said tactical link messages each comprising a first sequencing information in said header portion for sequencing said tactical link messages over said tactical link in accordance with said tactical link protocol standard, and
    wherein said electronic processor executes a Ethernet tunneling protocol and places a second sequencing information in said header portion of said tactical link for deterministic reassembly of said Ethernet packets, and
    wherein said electronic processor places at least a portion of said Ethernet packets in said data portion of said tactical link messages.

16. A method for tunneling Ethernet packets, comprising:
    receiving an Ethernet packet from a TAP interface;
    creating one or more tactical link messages to tunnel said Ethernet packet across a tactical link;
    executing an Ethernet tunneling protocol to place said Ethernet packet into said one or more tactical link messages,
       wherein a header portion of said one or more tactical link messages includes a first sequencing information for sequencing said tactical link messages in accordance with a tactical link protocol associated with said tactical link,
       wherein said header portion of said one or more tactical link messages includes a second sequencing information for deterministic reassembly of said Ethernet packet from said one or more tactical link messages; and
    transmitting said plurality of tactical link messages over a tactical link to a receiving TAP interface.

17. The method of claim 16, wherein said operation of executing an Ethernet tunneling protocol further comprises:

placing a source identifier that is unique to a node of a tactical network in said header portion of said one or more tactical link messages.

18. The method of claim 16, wherein said operation of executing an Ethernet tunneling protocol further comprises:
   placing at least a portion of said Ethernet packet in a data portion of said one or more tactical link messages.

19. The method of claim 16, wherein: said second sequencing information is selected from the group consisting of a sequence number and a frame number.

20. The method of claim 16, wherein said second sequencing information is interspersed with other header data of the tactical link messages in said header portion of said one or more tactical link messages.

21. The method of claim 20, wherein said second sequencing information is stored in one or more non-contiguous bits in said header portion of said one or more tactical link messages.

22. The method of claim 16, further comprising:
   receiving said tactical link message over a tactical link;
   uniquely identifying said tactical link messages as part of said Ethernet packet using said second sequencing information; and
   reassembling said Ethernet packet from said tactical link messages.

23. The method of claim 16, wherein said tactical link is selected from the group consisting of an encrypted link, a GA/HA filtered tactical link, a Link 16.0 link, a TADIL-J link, a TCDL link, a CDL link, and an FDL link, and wherein said tactical link is on a tactical network selected from the group consisting of a military network, a JTIDS network, and a GIG network.

\* \* \* \* \*